Figure 1:
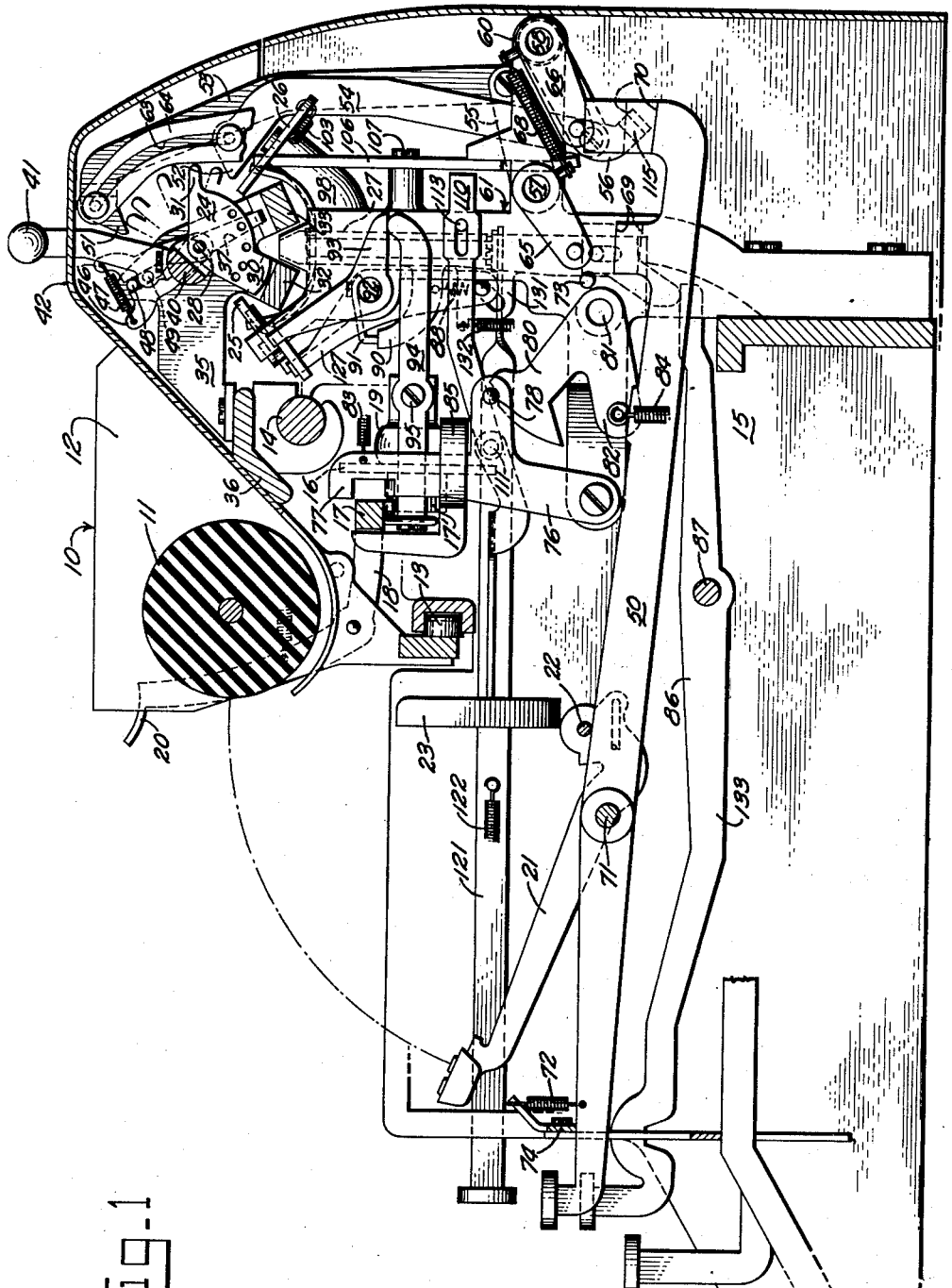

Sept. 26, 1944.  J. TOGGENBURGER  2,359,062
TYPEWRITING MACHINE
Filed Dec. 31, 1941  6 Sheets-Sheet 1

INVENTOR
JOHN TOGGENBURGER
BY
R. G. Julihn
ATTORNEY

Sept. 26, 1944.  J. TOGGENBURGER  2,359,062
TYPEWRITING MACHINE
Filed Dec. 31, 1941  6 Sheets-Sheet 3

INVENTOR
JOHN TOGGENBURGER
BY
ATTORNEY

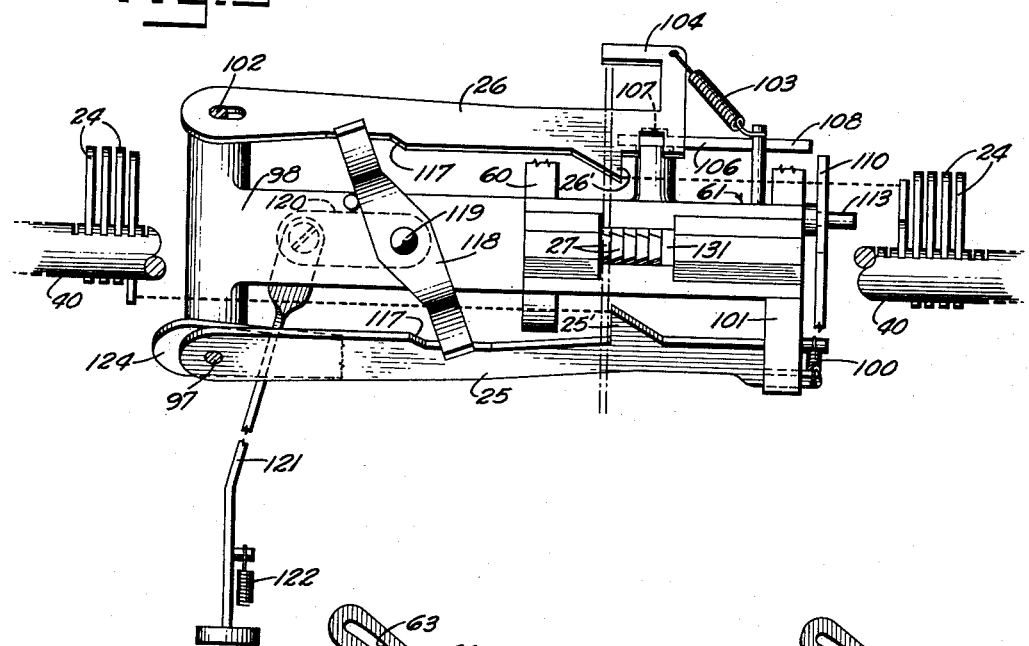
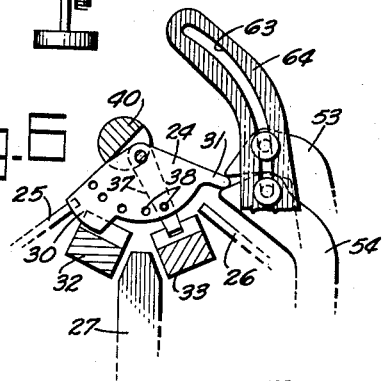
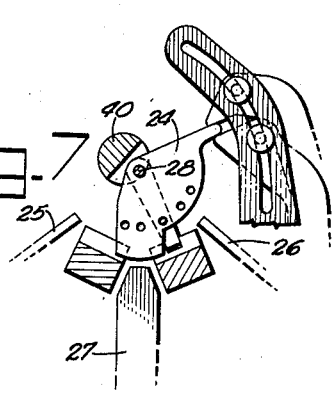
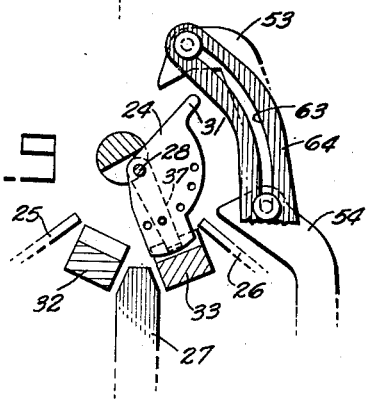
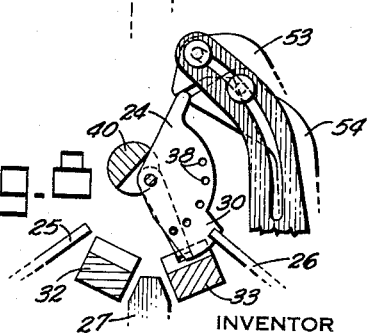

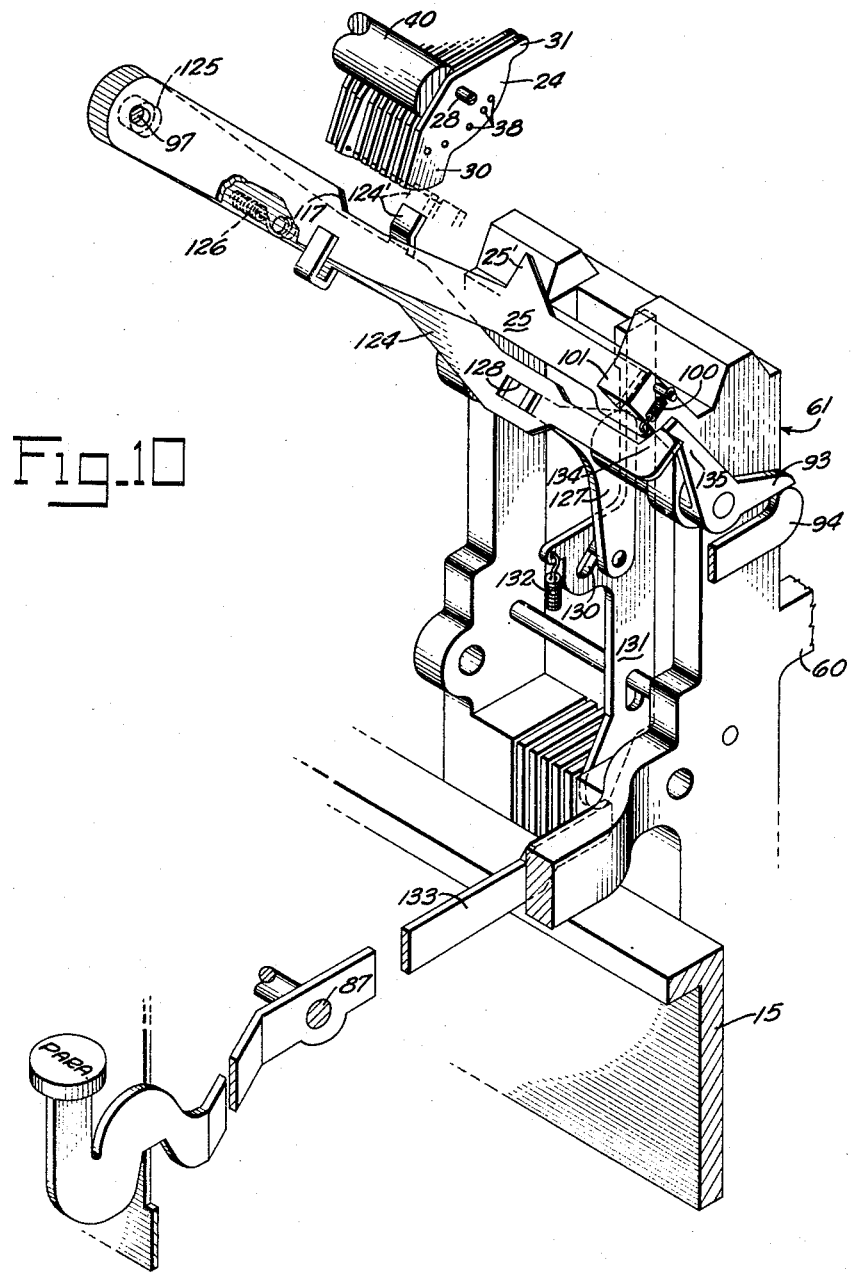

Sept. 26, 1944.  J. TOGGENBURGER  2,359,062
TYPEWRITING MACHINE
Filed Dec. 31, 1941   6 Sheets-Sheet 6

INVENTOR
JOHN TOGGENBURGER
BY
ATTORNEY

Patented Sept. 26, 1944

2,359,062

UNITED STATES PATENT OFFICE 2,359,062

TYPEWRITING MACHINE

John Toggenburger, Hartford, Conn., assignor to Underwood Elliott Fisher Company, New York, N. Y., a corporation of Delaware Application December 31, 1941, Serial No. 425,076

25 Claims. (Cl. 197—63)

This invention relates to typewriting machines and the like, and more particularly to key-operable carriage-stop mechanisms thereof.

One of the objects of the invention is to provide an improved carriage-stop mechanism of simple, economical organization, reliably operative in extended service and adapted for control entirely from the region of the typewriter keyboard.

A further object is to provide, in a carriage-stop mechanism, a stop-setting and restoring mechanism including key-operable means by the selective operation of which a key may be moved from any one position in which it may be, either ineffective, margin gaging or tabulating, to any other desired position, merely by a one-stroke operation of a selected key.

Another object resides in providing a key-controlled, margin-gaging and tabulating mechanism having the key-settable stops identical throughout the length of the carriage run, and having improved counterstop means operative to lock the typing instrumentalities at a line end and capable of arresting the stops which define the opposite margins of a typing line, at the same letter-space position in the range of carriage travel as that at which the stops were set; thereby eliminating any discrepancy between the carriage positions at the time of setting the stops and its arrested positions in typing.

A further object resides in providing an improved key-settable margin-gaging mechanism employing individual counterstops for right and left margin gaging, retractable from the path of the stops to effect margin release and automatically restorable to within the normal typing range when the carriage is returned to within said range; the counterstop for line-end gaging being limitedly shiftable after stop interception, to operate a line-locking mechanism, and both counterstops being arranged to arrest the stops in the same position or station in which the stops were set.

A still further object is to provide a margin-gaging mechanism having an improved arrangement of stops, with reference to the effective and ineffective positions at which each stop may be set, and having an improved association of the counterstops therewith, affording a firm banking for each stop in any of its effective positions for impact with the counterstops and obviating any risk of displacing the stops during cooperation with the counterstop.

Another object resides in providing, in association with the stop-setting mechanism, means for locking the carriage in letter-feed control, thereby forestalling unintentional carriage release and preventing damage to the mechanism from collision of the carriage stops with the setting devices during a spring-impelled carriage run.

A further object is to provide mechanism to lock the stop-setting keys against operation when the carriage is moved in letter-feed control or in return travel and when the carriage is released from letter-feed control for spring-impelled travel; the locking mechanism thus preventing damage from collision of the parts while the carriage is so moved.

A further object is to provide, in a key-set margin-gaging mechanism, a paragraphing device operative by a single key to cause the carriage to travel from line-start position and automatically indent a line for the start of a paragraph at a certain distance from the normal line-start or left-hand margin, the amount of indentation being maintained notwithstanding the change in location of said margin.

Another object is to provide a paragraphing device adapted to cooperate with the carriage-carried stop which normally defines the left-hand margin of the typing, and having key means to release the carriage to a spring-impelled run and render effective stop-engaging means simultaneously, so that the complete paragraphing operation may be effected merely by depressing a single key.

A further object resides in the provision of a carriage-stop mechanism also adapted to define a line-start position indented from the left-hand margin for paragraphing, operative with exactness as to a particular letter space of the indented position, whether the carriage is moved to the paragraphing point from one or the other limit of travel, that is, from either the left or right margin-defining positions.

Other objects will be hereinafter manifest.

Figure 2:
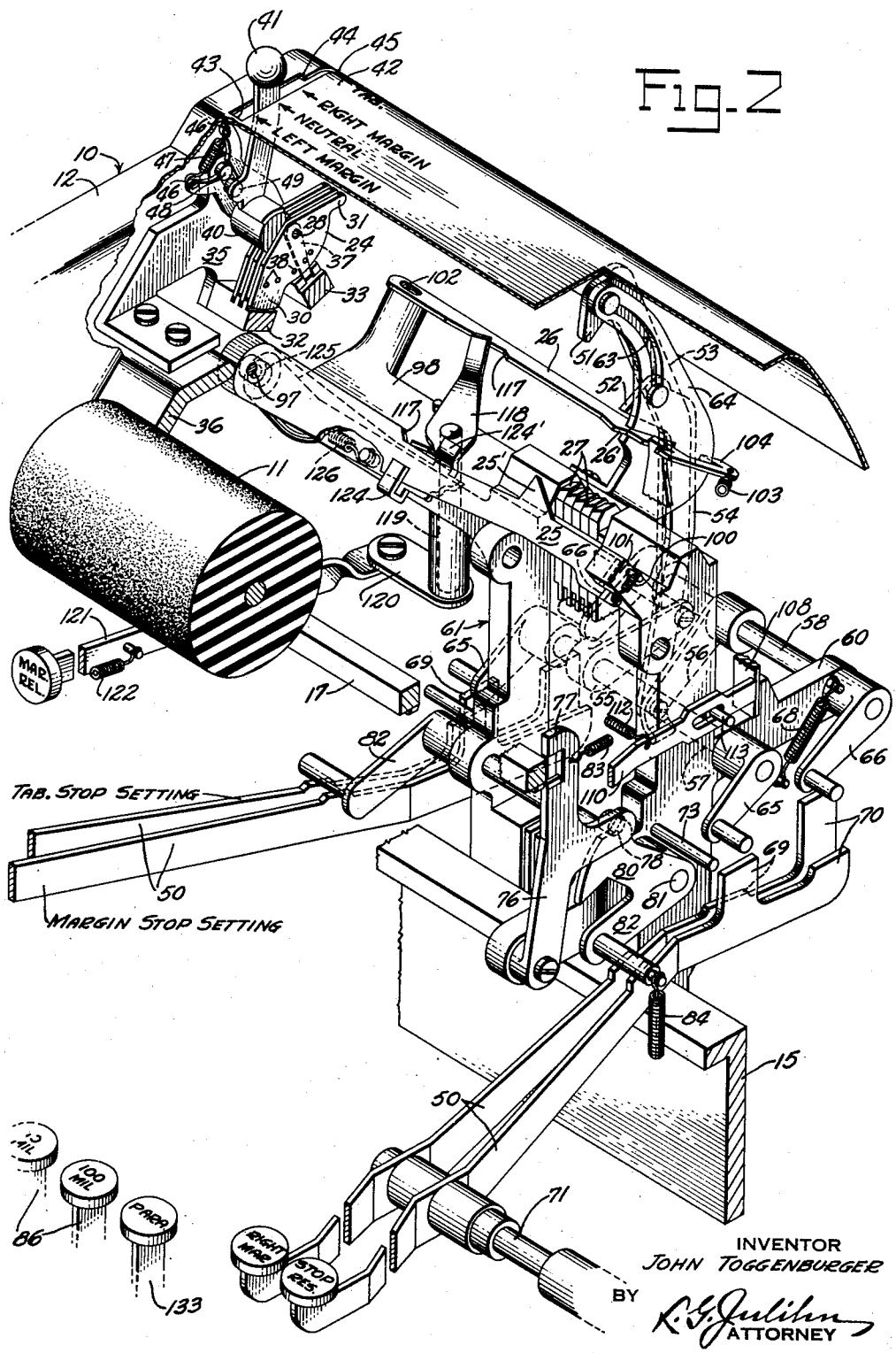
Figure 3:
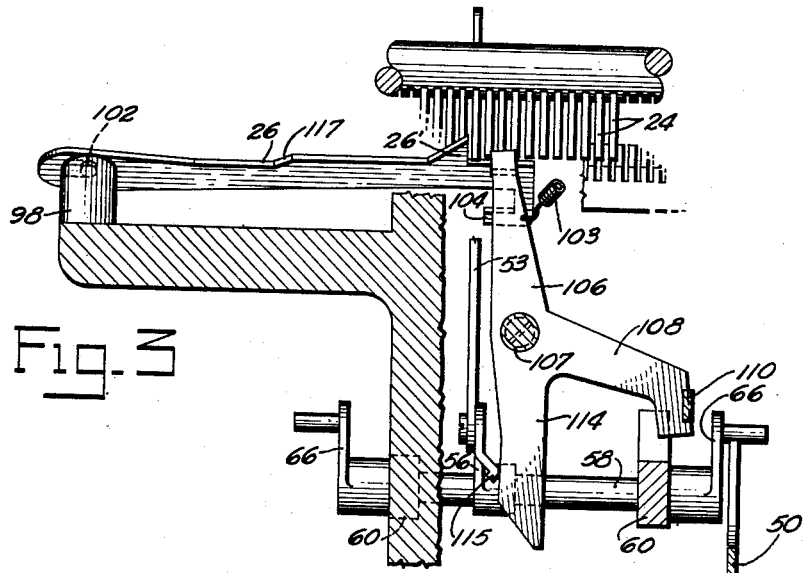
Figure 4:
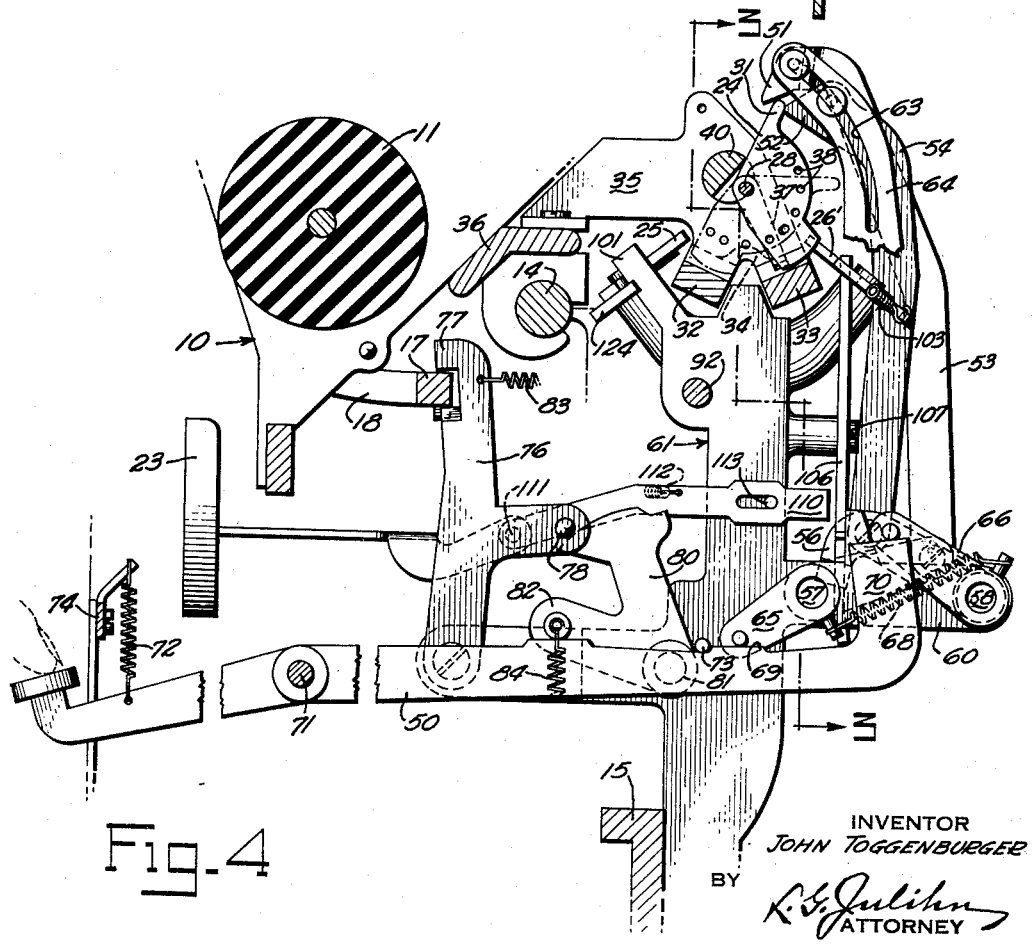
Figure 11:
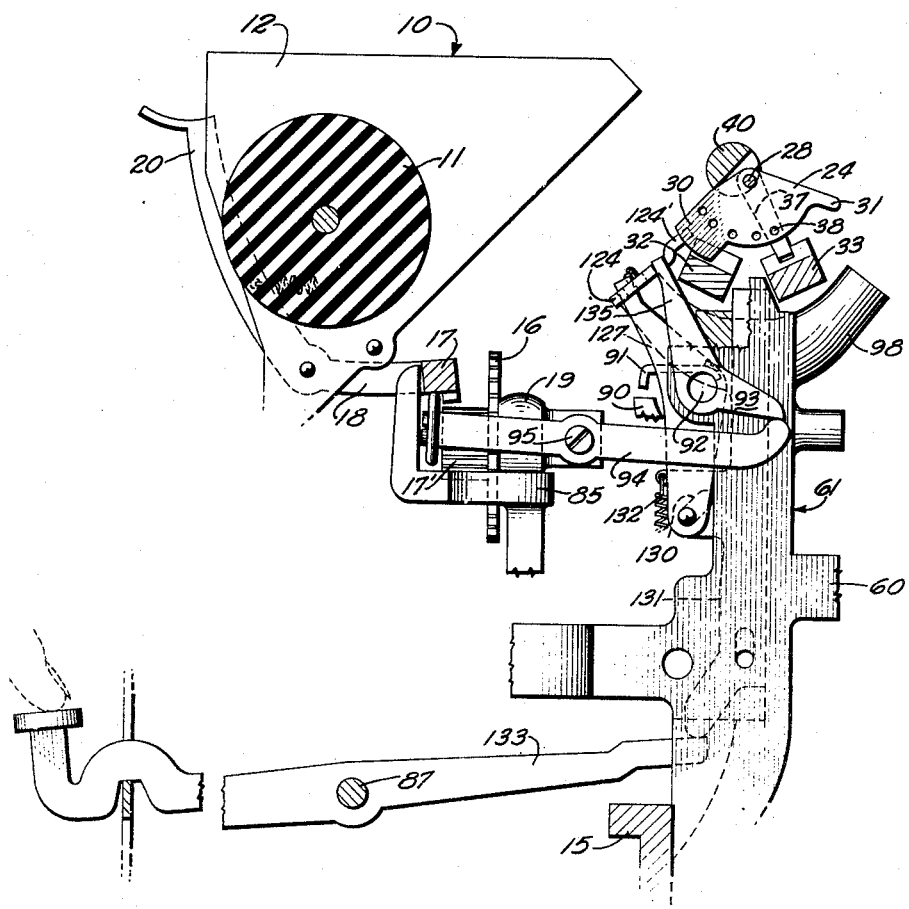

In the drawings:

Figure 1 is a sectional view of a typewriting machine embodying the invention, the view being taken on a fore-and-aft vertical plane of the machine, Figure 2 is a perspective view of the mechanism embodying the invention, portions of the mechanism parts being broken away to facilitate illustration, Figure 3 is a sectional view taken on line 3—3 of Figure 4, showing the action of the mechanism in shifting the right-hand margin counterstop preparatory to setting a stop for gaging the right-hand margin, Figure 4 is a view similar to Figure 1 but showing the stop-setting mechanism operated to set a right-hand or line-end stop, Figure 5 is a fragmentary plan view of the counterstop arrangement, Figures 6, 7, 8, and 9 are fragmentary sectional views illustrating the manner of setting the stops to the various positions; Figure 6 being for line-start or left margin gaging, Figure 7 for tabulating, Figure 8 for line-end or right margin gaging, and Figure 9, setting to the second ineffective position, Figure 10 is a fragmentary perspective view showing the paragraphing-stop mechanism in quiescent position, and Figure 11 is a side-elevation view of the paragraphing-stop mechanism in operated condition.

Referring now more particularly to Figure 1 of the drawings, a carriage 10 has a platen cylinder 11 rotatably mounted in end members 12 thereof. The carriage is guided for line-typing and return movement on trackways 13 and 14 supported on the main frame 15 of the machine. The usual spring drum, not shown, moves the carriage in letter-feed direction under control of a usual letter-feed escapement mechanism of which an escapement wheel 16 is arranged to rotate with a pinion 17' in mesh with a gear rack 17 supported by arms 18 pivotally mounted on the carriage end members. The letter-feed escapement wheel and the associated pinion 17' are held on a shaft journaled in a bearing bracket 19 mounted on the main frame 15. At least one of the arms 18 forms part of a carriage-release lever 20 by operation of which the rack 17 may be moved out of mesh with the pinion 17' for locating the carriage at any letter-space position. The typing instrumentalities may be of any known kind and may include type bars 21 pivotally mounted at 22 for swinging movement to strike against the platen 11, being actuated by type keys in the usual manner. In approaching the platen the type bars 21 engage and move a universal bar 23 which is operatively connected to the mentioned letter-feed escapement mechanism, causing the latter to release the carriage at letter-space intervals, so that in consequence of each type-key operation, the carriage is advanced step by step to type the characters along a typing line.

The mechanism for controlling the length of the typing line within selective margins, for indenting a line to start a paragraph, and for arresting the carriage at selected columns or tabulating positions forms the subject matter of the present invention, namely, a combined margin-gaging and tabulator mechanism, now to be described. To facilitate a clearer understanding, the several mechanisms constituting the invention are separately described.

Stop and counterstop arrangement

A series of stops 24 are arranged, preferably on the carriage, spaced at letter-space increments or in definite ratio thereto, in a continuous array extending substantially throughout the length of the carriage run. The stops of the complete series may be identical in size and form with each other and are each individually settable from an ineffective position to a plurality of effective settings for either left-hand margin gaging, as shown in Figure 6; right-hand margin gaging, Figure 8; or tabulating, Figure 7, in each of which effective positions the stops are adapted to cooperate with certain counterstops provided for each function. The counterstops for left- and right-hand margin gaging are indicated respectively at 25, 26 and the tabulator counterstops are shown at 27 comprising a group of aligned, letter-spaced blades providing for column and denominational tabulating, the blade at the leftward end of the group serving as the column tabulating counterstop. For a clear understanding of the general cooperation of the carriage stops 24 with the several counterstops, only this leftmost blade, for column tabulating, need be considered in that the other blades representing the several denominations function in the same way, except that they afford selection of a particular denomination, in the well-known manner.

It will be observed that the several selective positions of the stops 24 are assumed by rotation of each stop about a common pivot rod 28, and the several mentioned counterstops 25, 26 and 27 are oriented about this pivotal axis, preferably with the tabulator counterstop 27 in the medial position, and the two margin counterstops 25 and 26 at each side, as shown best in Figure 1.

Stop rack organization

Each stop 24 is formed to provide a counterstop-engageable tab 30 and a stop-setting or restoring finger 31, each projecting radially from the body of the stop. In order that the stop tab 30 be firmly backed so as to withstand the impact sustained in arresting the carriage either at the margins or at the tabulating positions, this tab 30 is always supported by the teeth of rack bars 32 and 33, in any position of the stops, as shown in Figures 6 to 8. The rack bars 32, 33 may present a unitary structure by having each of the two bars connected longitudinally by a bridging member or yoke 34, Figure 4. Each rack bar is slotted transversely to provide a series of aligned teeth forming slots in which the stop tabs 30 may be disposed in the various angular positions of the stops. The rack bars 32, 33 and the pivot rod 28 are supported at their opposite ends, as shown best in Figure 2, by a bracket 35 secured to a longitudinal member 36 of the carriage. Each bracket has lugs to which the rack bars are secured, and presents a socket receiving an end of the pivot rod 28.

The stops 24 are each detented at all positions by individual detent springs 37 disposed adjacent each stop. Each detent spring 37 is held at one end on the pivot rod 28, and at its opposite end is nested in a longitudinal slot of the rack bar 33. A projection on each detent spring coacts with one of a series of recesses 38 in each stop 24, one such recess being provided for each selective position of the stop.

Collective stop restoring

Mechanism is provided by which all of the stops 24 set at any one of the effective positions may be restored to an ineffective position, and by the selective operation of which all of the stops set for right margin gaging or all of the stops set for left margin gaging may be restored collectively to a neutral position without, in either case, disturbing the stops set for tabulating. This mechanism includes a restoring bar 40 extending along the entire series of stops and slotted transversely to form a series of segmental teeth which support the bar and may serve as spacers between the adjacent stops 24. The restoring bar 40 is arranged to rotate about the same axis as the stops 24, having a longitudinal opening through the series of teeth thereof in which the stop pivot rod 28 is disposed. Although the restoring bar is supported for oscillation on the stop pivot rod, this rod is materially reinforced by its support in the teeth of the bar. The solid section of the bar 40 has opposite corners thereof so arranged in relation to the pivot 28 that they are brought into engagement with the set stops collectively when the restoring bar is oscillated in either direction from its quiescent position shown. These corners, however, are normally clear of the stops so as to allow the stops to be set to any desired positions. The restoring bar 40 may be oscillated selective degrees by operation of a hand lever 41 secured to the bar. This hand lever is laterally flexible so that same may be caused to engage selectively certain shoulders of a slot in a cover member 42 of the carriage through which the hand lever projects, see Figure 2. When the lever 41 is brought against a shoulder 43, all of the stops set for left margin gaging only are restored; and when said lever is brought against a shoulder 44, all of the stops set for right margin gaging only are restored. When the lever 41 is flexed rightwardly as viewed in Figure 2, same is movable in the elongate portion of the slot and may be swung to the limit defined by a shoulder 45, during which movement, all of the stops set for tabulating are restored to ineffective position. It will be seen that when the lever 41 is oscillated fully between shoulders 43 and 45, all of the set stops, regardless of their previous positions, are restored to the ineffective position shown in Figure 2.

It may be here noted that the stops 24 may assume a second ineffective position, see Figure 9, in which the stop tab 30 is within the lateral limits of the rack bar 33, instead of within the limits of rack bar 32, when in the first ineffective position. This second ineffective position is provided in order that the stops set for right-hand margin gaging, Figure 8, may be rendered ineffective without disturbing the stops set for tabulating, Figure 7, this being accomplished, as previously described, by swinging lever 41 against the shoulder 44. It will be seen from the mode of operation of the stop-setting mechanism hereinafter described, that the stops may be set to any effective position from either of the ineffective positions which the stop may assume prior to stop setting.

After actuation, the restoring bar 40 is returned to its neutral position by means shown best in Figures 1 and 2. Two arms 46 are pivoted on the rod 28 and extend therefrom in parallelism with each other, having at their free ends a spring 47 urging the arms toward each other, normally into engagement with a stop pin 48 on the bracket 35. These spring-pressed arms 46 coact with a stud 49 projecting from the restoring lever 41, yieldably holding said lever in its quiescent position. When the restoring lever 41 is swung in either direction, one of the arms 46 moves with it against the tension of spring 47 while the other arm of the pair, acting as an anchor for the spring 47, remains against the stop pin 48. When the restoring lever is released, the tension of spring 47 brings said lever to its neutral position.

*Stop-setting and restoring mechanism*

This mechanism, shown best in Figures 1 and 2, includes a series of key levers 50 by the selective operation of which any one stop, positioned at the stop-setting station by appropriately locating the carriage, may be moved from any one setting in which it may be to any other desired setting, either ineffective, margin gaging or tabulating, merely by a one-stroke operation of the selected key. Two setting jaws 51, 52 are arranged to operate in said stop-setting station which occupies a letter-space point preferably midway of the length of the carriage run or near the lateral center of the machine in order that the series of stops may be substantially coextensive with the carriage and be embraced within the normal carriage end limits. Upon the operation of any one of the key levers 50, the two jaws 51, 52 are brought toward each other in an arcuate path, each advancing a predetermined extent and coming into engagement with the setting finger 31 of the particular stop disposed at said station to carry said finger, and thus rotate the stop, to a certain prescribed angular position, depending on which key lever 50 has been operated. It will be noted that in quiescent condition the two jaws 51, 52 are separated an angular distance sufficient to embrace the maximum angular displacement of the stops 24; and when operated are differentially displaced toward each other, coming to rest at a predetermined angle relatively to the stop pivot axis 28, with the stop finger 31 engaged between said jaws, see Figures 6 to 9, inclusive. The jaws 51, 52 are parts of downwardly extending links 53, 54 respectively, these links being articulated at their lower ends to arms 55, 56 secured to shafts 57, 58, respectively, journaled in bearing brackets 60 extending from a housing 61 supporting the tabulator counterstops. The jaws 51, 52 are guided in an arcuate path toward each other by a stud on each jaw link riding in an arcuate slot 63 formed in a guide bracket 64 also secured to the tabulator housing, this slot having its arc substantially concentric with the stop pivot 28. The shaft 57 carrying arm 55 extends laterally of the machine and has secured at each end thereof a crank arm 65 carrying a crank pin at its free end. The shaft 58 carrying arm 56 is similarly arranged and has at each end a crank arm 66 bearing a crank pin. It will be noted that when the setting mechanism is operated by a selected key lever 50, the jaw 51 is moved downwardly while the jaw 52 is simultaneously moved upwardly, except in the instances in which one of the jaws remains practically stationary. Correspondingly, arm 55, actuating jaw 51, rotates clockwise and arm 56 actuating jaw 52 rotates counterclockwise, as viewed in Figure 1. A spring 68 connected at each end to arms projecting in opposite directions from the two shafts 57, 58, restores the setting mechanism to its quiescent position in which the two jaws are separated the maximum extent defined by the ends of slot 63.

The differential displacement of the two jaws 51, 52 is effected by the differential rotation of the pair of arms 65, 66 at either ends of the shafts 57, 58, that is, by raising the crank pins of these arms different extents from their quiescent positions. These crank pins are differentially actuated by being engaged by a pair of upstanding lugs 69, 70 of different altitudes carried on each of the stop-setting key levers 50. The differential height of the two lugs of each pair determines the differential displacement of the corresponding crank pins and, correspondingly, determines the different extents that the jaws 51, 52 are actuated.

The key levers 50 may be fulcrumed on stub shafts 71 supported on the main frame of the machine and may be restored to quiescent position by springs 72. Studs 73 on the tabulator housing limit the swing of the key levers 50 which in quiescent position engage the ends of slots in a comb plate 74.

The operation of the setting mechanism to set a stop for right-hand margin gaging, shown in Figure 4, will illustrate generally the mode of operation to move a stop to any desired position. The key lever 50 identifying the stop setting desired, in this instance "right margin," is operated, thus raising the two lugs 69, 70 into coaction, respectively, with crank arms 65, 66. To set a right-hand margin stop, the setting finger 31 of the stop is swung to its uppermost position. Therefore, the upper jaw 51 need not be moved, for which reason, the lug 69 is of a minimum, ineffective height. The lower jaw 52, however, is moved the maximum extent, and, therefore, the corresponding lug 70 is the full height. The lower jaw being thus actuated, moves upwardly, engaging the stop finger 31 at whatever position it may be, carrying same with it to the desired, uppermost position in which the stop 24 has its tab 30 positioned in line with the right-hand margin counterstop 26.

As aforeindicated, the differential height of the two lugs 69, 70 on each key lever 50 determines the position to which the stop finger 31 is set. As a further example, in the instance of setting a stop for tabulating, the key lever 50 for setting such a stop has its lugs 69, 70 of substantially the same height in that the setting finger 31 is to be moved to a medial position to align the stop tab 30 with the tabulator counterstops 27. Therefore, the two jaws 51, 52 are moved toward each other a like distance, so that after actuation they assume a position close to each other about midway between their quiescent positions, see Figure 7. In setting a stop to any selected position, one or the other of the two setting jaws picks up the setting finger in whatever position it may be and sets it at the selected position. In setting a stop for tabulating the two jaws 51, 52 each move the corresponding distance of approximately one-half of the maximum stroke. In setting a stop to the ineffective position shown in Figure 1, one jaw is moved approximately one-quarter of the maximum stroke while the other jaw is moved the complemental three-quarters of the stroke. In setting a stop for either left or right margin gaging, Figures 6 and 8, one jaw remains practically stationary while the other jaw is moved the maximum stroke. In this last instance, the one jaw that is said to remain stationary, is preferably moved slightly from quiescent position so that, together with the other jaw, it locates the setting finger 31 exactly and positively at the new position, without risk of overthrow.

Carriage-locking mechanism

As a precaution against unintended release of the carriage, particularly to avoid damage to the mechanism such as bending of the stop fingers 31 colliding with the operating jaws 51, 52 during stop setting, the letter-feed rack 17 is automatically locked down upon the operation of any stop-setting key lever 50. As shown best in Figures 2 and 4, a rack locking lever 76 pivoted on a bracket of the tabulator housing 61, has at its free end a yoke-like portion 77 adapted to straddle the letter-feed rack 17 in a manner to prevent raising of said rack to institute a carriage run, and is also adapted to engage between two teeth of the rack to prevent carriage movement from a letter-feed position. The lever 76 is swung to locking position by having a pin 78 thereon actuated by a cam arm 80 secured to a shaft 81 journaled in the tabulator housing. The shaft 81 has a crank arm 82 secured thereto at each end, each crank arm having a pin engageable by the key levers 50 as the latter are actuated to set a stop. Springs 83 and 84 restore the locking lever 76 and the cam arm 80 respectively to normal position after actuation. The upper portion of the locking lever 76 may be supported against displacement laterally by being guided in a slot of an arm 85 on the bearing bracket 19. The cam of arm 80 has an abrupt rise at its initial portion, followed by a continuous dwell, by which cam contour the lever 76 is immediately swung to locking position during the initial actuation of the key levers 50, and is so maintained during the completion of the key lever stroke, holding the rack 17 and carriage locked until the actuated key lever is practically fully restored. This locking mechanism, in addition to locking the carriage during stop setting, operates conversely to prevent actuation of the setting key levers 50 when the rack 17 is raised to free the carriage, or when the carriage is off the exact letter-feed position. In either instance, the locking lever 76 is blocked against forward movement so that effective movement of the cam arm 80 is prevented. In the first instance the raised rack abuts the yoke-like end 77 of the locking lever 76, preventing its swing; in the second instance the moving rack, traveling with the carriage, does not allow the lower part of the yoke portion 77 to mesh between the rack teeth.

Tabulating mechanism

The mentioned tabulator counterstops or blades 27 are mounted in the housing 61 to shift up and down. The tabulator blades may be provided in any desired number sufficient to embrace the highest denomination to be tabulated, and have their upper ends, which form the tabulator counterstops, arranged at letter-space intervals. These upper ends may each be of a thickness equivalent to a letter space and are preferably arranged to lie one against the other as a pad so that impact of the carriage stop 24 on any one of the tabulator counterstops is backed by the other leftward counterstops, the leftmost one being backed by the tabulator housing. These counterstops are normally retracted out of the path of the stops 24 set for tabulating and are each projected into said path in the usual manner by selective operation of tabulator key levers 86, Figure 1, pivoted at 87 and having their rear ends engaging the corresponding tabulator blades, each blade and its key lever being restored by a spring 88. The carriage is released to a tabulating run upon the operation of any denominational key lever 86, in the usual manner, by moving the rack 17 out of mesh with the letter-feed pinion 17'. An arm 90 on each tabulator blade engages an actuator 91 common to all the blades and mounted on a rock shaft 92 on which an arm 93 swings a lever 94 pivoted at 95 on the bracket 19 and carrying a roller engageable with the letter-feed rack 17.

Margin-gaging counterstops

The margin counterstops 25, 26 are arranged, as previously described, to engage certain set stops 24 to arrest the carriage at either the left- or right-hand margin as defined by the particular stops set for these purposes. As shown best in Figure 5, the left-hand margin counterstop 25 presents an elongate arm having a pivot 97 at one end swingably mounting the counterstop on a bracket 98 extending from the tabulator housing. The axis of the pivot 97 is such that the counterstop 25 may swing in a plane radial to the axis 28 of the settable stops. The counterstop 25 is normally held in effective position, in which a shoulder 25' thereof is disposed in the path of any stop set for left-hand margin gaging, by a spring 100 holding the counterstop against a post 101 on the housing 61. The right-hand counterstop 26 has a pivot 102 mounting same on the bracket 98, the pivot engaging in an elongate slot of the counterstop to allow the latter to move endwise bodily, for purposes hereinafter manifest. The right-hand counterstop has a shoulder 26' normally disposed in the path of any stops 24 set for right-hand margin gaging. A spring 103 is arranged to yieldably hold the counterstop 26 in normal position with its shoulder 26' in said path, and in its rightmost position with the pivot 102 in the leftward end of the slot, in which position the shoulder 26' is to the right side or in advance of the stop-setting station defined by the setting jaws 51, 52 and indicated in Figure 5 by the dot-and-dash parallel lines. The guide bracket 64 for the setting jaws has a slot to guide the free end of the counterstop and a prong 104 on the counterstop normally engages the bracket 64, thus defining the normal raised position of the counterstop, see Figure 2.

The three counterstops 25, 26 and 27 each have their stop-engaging faces or shoulders arranged at certain relations to the stop-setting station shown in Figure 5 so that an engaged stop in any instance comes to rest in said station. This is necessary in order that the letter-feed position which the carriage assumes after the stop mechanisms have functioned is exactly the same in each case as the position assumed by the carriage at the time of setting the stops. The leftmost tabulator counterstop 27, by which the companion tabulator counterstops are located, has its stop face disposed just in advance or leftward of said setting station so that after a tabulator set stop banks against same and the counterstop is retracted, the set stop advances into said station as the carriage is restored to the control of the letter-feed mechanism. This slight advance of the carriage as the letter-feed escapement mechanism assumes control thereof is usual in Underwood standard machines and occurs as a result of the previous advance rotation of the letter-feed escapement wheel 16 under influence of its spring-pressed check dog, and takes place at the moment the feed rack 17 unmeshes with the escapement pinion 17'. The leftmost tabulator counterstop 27 is, therefore, arranged to engage a set stop so as to arrest the latter a sufficient degree of a letter space ahead of the actual stop-setting station so that said engaged stop will come to rest in said station when the carriage is again in control of the letter-feed mechanism.

In margin gaging when the carriage is returned to begin a new line of typing, the carriage travels independently of the letter-feed escapement mechanism, due to the action of the usual ratcheting mechanism or other over-riding clutch device. After the left-hand stop 24 engages the counterstop 25 to define the left margin or line start, upon returning the carriage, the carriage likewise advances leftward a fractional letter space under influence of its drum spring until said ratcheting mechanism or clutch device re-engages and thus checks the travel of the carriage. Therefore, the shoulder 25' is so positioned in relation to the stop-setting station that, after this fractional letter-space advance has occurred, the engaged stop will be positioned in said station. In right-hand margin gaging, the stop engaging the right-hand counterstop 26 comes to rest in said station after the counterstop has been moved bodily leftward to the limit defined by the slot on pivot 102.

*Line locking*

As has been stated, the counterstop 26 which controls the right-hand margin or the end of a typing line has its stop shoulder 26' normally somewhat back of, or to the right of, the setting station. This is desirable so that as the counterstop is carried along with the engaged stop, this movement of the counterstop may operate a line-locking mechanism. This counterstop movement against the tension of spring 103, after stop engagement, is also advantageous in margin releasing, as will be hereinafter manifest. In the present instance, line locking is accomplished by blocking movement of the letter-feed universal bar 23, although it will be observed that other known means for effecting line locking may be employed. As shown best in Figures 1, 2 and 3, a lever 106 pivoted at 107 on the tabulator housing has its upper end articulated to the counterstop 26 by engaging a slot thereof. The lever 106 has an arm 108, Figure 3, disposed adjacent the end of a push rod 110 flexibly connected to the universal bar 23 at 111, to reciprocate therewith during typing. As the carriage approaches the line end, the counterstop 26 is shifted bodily to the left, thereby swinging lever 106 and moving its arm 108 into the path of the push rod 110, obstructing its movement and consequently preventing vibration of the universal bar 23. In that the universal bar is thus locked, the type bars are prevented from striking the platen and the machine is thus line locked. The flexible connection 111 affords movement of the push rod 110 laterally of the machine from its normal position, against the tension of a spring 112. The rear portion of the push rod is guided by a pin 113 riding in a slot of the rod, this guide being so arranged as to accommodate the lateral displacement of the rod. This construction allows the line locking mechanism to operate notwithstanding that the universal bar 23 has not been restored forwardly and the push rod 110 is, therefore, projected into the path of arm 108. Under such conditions, the rod 110 will yield laterally upon engagement by arm 108 but will snap into locking relation with said arm as soon as the universal bar 23 is restored to quiescent position.

*Setting stop for gaging right-hand margin*

In setting a stop for line-end or right-hand margin gaging, it is desirable to shift the counterstop 26 to its actual carriage-arresting position preparatory to setting the stop; this, in order that the counterstop shoulder 26' be at the left side of the set stop, the side of which the shoulder is to be in order to engage and arrest a right-hand stop moving leftwardly before arresting the carriage at the typing line end. If the counterstop 26 is not shifted concomitantly with the setting of a stop, the carriage must be moved leftward after stop setting, during which the set stop will ride up the incline of the counterstop shoulder 26' until it is leftward of said shoulder, whence the counterstop 26 will snap up into its normal position.

The counterstop 26 is preferably shifted leftwardly preparatory to setting the right-hand margin stop, by mechanism including the lever 106, Figure 3, which has a cam arm 114 cooperable with a cam 115 carried on the setting arm 56. As heretofore described, this arm 56 moves through a full stroke in setting a right-hand margin stop, see Figure 4. It is also to be noted that the tab 30 of the stop being set does not get near the counterstop, that is, it does not closely approach its effective position beyond the rack bar 33, until arm 56 has moved about three-quarters of its full stroke. In view of this fact, the counterstop 26 may be shifted in the latter phase of the full setting stroke and yet be shifted before the stop is completely set, by arranging the cam 115 so that it starts actuation of arm 114 after arm 56 has moved through about half its stroke but completes actuation of arm 114 before it completes setting of the stop. Thus, the arm 56, in so far as it affects shifting of the counterstop, will idle through about the initial half of its full stroke, then shift the counterstop, and thereafter complete the setting of the stop to its position effective for right-hand margin gaging. By having the counterstop shifted at this phase in the cycle of setting a right-hand stop, needless shifting of the counterstop in setting the stops 24 for other purposes is practically avoided. This is easily accomplished in that the arm 56 moves through only about the initial half of its stroke in setting the stops for purposes other than right-hand margin gaging. Waiving the advantage of avoiding needless counterstop shifting, the necessary shifting may take place during the initial phase of the stop-setting cycle.

If the mechanism is arranged so that counterstop shifting occurs only after the right-hand stop has been set, then this set stop will assume a position across the incline of shoulder 26' which, during the subsequent shifting of the counterstop, will cam the latter downwardly until the shoulder 26' moves past the set stop and snaps into its effective position leftward thereof.

Margin release

Release of the carriage for travel beyond the line-end limits defined by the right and left margin stops is effected by retracting the engaged counterstop. As shown in Figure 5, each counterstop 25, 26 has a cam 117 engageable by one of the arms of a two-arm lever 118 carried on a shaft 119 journaled in the bracket 98 and having a lever 120 operable by a push rod 121 extending forwardly to the region of the keyboard and carrying a release key. A spring 122 restores the mechanism to normal position in which lever 118 engages a stop pin 123. When said key is pressed, the lever 118 rotates clockwise, as viewed in Figure 5 to coact with the two cams 117 and the two counterstops 25, 26 are swung about their pivots so that the respective stop shoulders 25', 26' are withdrawn from the path of the set margin stops.

In releasing the carriage for typing beyond the left margin, the carriage, after being released, is moved to the extreme limit of its travel, or at least beyond the left margin position, before releasing the margin-release key so that when the latter is released the previously engaged margin stop is to the right of the shoulder 25'. Upon completion of the typing beyond said margin, the continued letter-space advance of the carriage causes the counterstop 25 to be automatically restored in that the set stop engages the incline at 25' momentarily retracting the counterstop until the shoulder 25' snaps into normal position in the path of, and to the right of, the effective stop.

When the release key is pressed to allow for typing beyond the right-hand margin or normal line end, the counterstop 26, having been previously displaced leftwardly by engagement of the set stop with its shoulder 26', springs to its rightward position in which the shoulder 26' is at the opposite side of the set stop and the carriage is, therefore, free for typing beyond the margin. Automatic restoration of the counterstop 26 to normal position, as the carriage is again brought into the normal line-typing zone, is effected in the same manner as that described for the left-hand counterstop.

It will be noted that because of the arrangement of the counterstops 25, 26 for swinging movement in planes radiating from the axis of rotation 28 of the settable stops, there is no tendency to displace the effective stop from its set position during restoration after margin release, in that the reaction on the set stops by the counterstops is in a radial direction transmitted directly to the stop pivot 28.

Paragraphing

Provision is made for barring travel of the carriage, after movement from either line end, at a point a prescribed number of letter spaces from the selected left-hand margin, that is, at a point indented a certain distance from the then effective line-start position. The mechanism is organized so that, to bring the carriage to the paragraphing point from the line-start position, the operator need only press a paragraphing key. This releases the carriage to spring-impelled rightward travel and simultaneously projects a paragraphing counterstop into the path of the left-hand margin stop. To position the carriage for paragraphing, starting with the carriage at line-end position, the operator need only press said paragraphing key and return the carriage manually.

With reference particularly to Figures 10 and 11, the mentioned paragraphing counterstop is indicated at 124 and presents an elongate member similar to the counterstops 25, 26 but has a tab 124' providing stop faces at opposite sides thereof. A collar 125 on the pin 97 plays in an elongate slot of counterstop 124, providing pivotal and endwise sliding movement therefor. A spring 126 yieldably holds the counterstop in its leftmost position. The tab 124' is offset from the body of the counterstop so that it is disposed in the same plane as is the shoulder 25' of the left-hand margin counterstop. Normally, the counterstop 124 is retracted so that its tab 124' is ineffective, but upon swinging the counterstop upward, its tab 124' is projected into the path of any stop set for left-hand margin gaging. When the tab 124' is raised and the carriage is moved from line-end position, the stop 24 set for gaging the left margin strikes the tab 124' and, after moving the counterstop 124 a limited extent, arrests carriage travel at a point indented from the left-hand margin, which margin the same stop defines when in cooperation with the counterstop shoulder 25'. After being engaged by the carriage stop 24, the tab 124' moves rightward to the second dotted position shown in Figure 10, said movement being limited by the left end of the slot engaging the collar 125. When paragraphing is desired, with the carriage at line-start position, the carriage is released to a spring-impelled run by means hereinafter described, and the tab 124', being now in effective position, intercepts the rightwardly traveling carriage stop 24, arresting the carriage at the indented position for paragraphing. The tab 124' arrests the effective carriage stop 24 at the same position, whether the carriage has been moving leftwardly or rightwardly, in that the extent of endwise motion of the counterstop 124 is determined with this in mind, taking into account the combined thicknesses of the stop 24 and tab 124'. In other words, the endwise movement which the counterstop 124 may take is limited to a distance equal to the aggregate thickness of the stop 24 and the tab 124'.

The mechanism for projecting the tab 124' to an effective position includes a lever 127 loosely mounted for rotation on the shaft 92 and having one arm thereof engaging a slot 128 in the counterstop. The other arm of lever 127 has a pin cooperating in an inclined cam slot 130 of a blade 131 mounted for up-and-down movement. A spring 132 urges the blade 131 downward and, through the coaction of cam slot 130 on the lever 127, yieldably holds the counterstop 124 with its tab retracted. The blade 131 may be similar to the tabulator blades 27 except that its upper end does not present a counterstop tab. A key lever 133, also pivoted at 87, may be arranged in a manner generally similar to the denominational key levers 86 and has its rearward end engaging the bottom of blade 131. Through the medium of the blade 131 and lever 127, the counterstop tab 124' is projected to effective position upon depressing the paragraphing key lever 133.

Carriage release is effected automatically, concomitantly with the projection of the paragraphing tab 124', by mechanism including an arm 134 extending from the counterstop 124 and engageable with an arm 135 mounted on shaft 92. Swinging of arm 135 clockwise, as viewed in Figures 10 and 11, institutes a carriage run by raising the letter-feed rack 17, through the actuation of levers 93, 94.

In the described operation of bringing the carriage to the paragraphing point from the line-end or right-margin position, the carriage is released from letter-feed control and is manually moved rightward in carriage-return direction against the force of its spring. When carriage travel is arrested at the paragraphing point by interception of stop 24 by the counterstop tab 124', it is necessary that the carriage be automatically restored to letter-feed control before the typist releases the paragraphing key or lets go of the carriage. Otherwise, the typist would be required to carefully hold the carriage stationary at the paragraphing position, meanwhile avoiding further pressure on the carriage in return direction, until the paragraphing key is released and the carriage is thereby restored to letter-feed control. That is, the typist would have to momentarily control the exact position of the carriage manually while its control was being transferred from the paragraph-stop mechanism to the letter-feed mechanism by release of the paragraphing key. In the present invention, the typist is relieved of this inefficient operation by automatically transferring the carriage to letter-feed control as the counterstop tab 124' intercepts the stop 24. As described, the preceding release of the carriage from letter-feed control is accomplished by direct engagement of the paragraphing counterstop with the carriage-release mechanism, that is, by the direct engagement of the release lever 135 by the counterstop arm 134 during the raising of the counterstop to project the tab 124' into the stop path. Upon stop interception, the counterstop 124 moves rightward a limited extent and this causes the end of the counterstop arm 134 to ride off the arm 135 just before the counterstop assumes its rightward limit. Thus, the arm 135 is released from its moved position, thereby allowing the rack 17 to again mesh with its pinion 17' and resume letter-feed control of the carriage, although the paragraphing key is held depressed. Before this key is released, it is desirable to let go of the carriage to avoid moving same past paragraphing position. Upon release of said key and the resultant retraction of the counterstop 124, the arm 134 thereof again slips under arm 135 as the counterstop is pulled leftward by its spring 126.

What is claimed is:

1. In a carriage-stop mechanism for typewriters, a stop-and-rack assembly including, a series of stops each having a carriage-stopping tab, a rack bar having teeth at letter-space intervals defining grooves in which said stop tabs nest, the tabs being of a width to be contained wholly within the lateral limits of the bar in one position of the stops, and means supporting the stops for shifting laterally of the rack bar to permit projecting the tab of each stop partially beyond either side of the rack bar in either of two effective positions for stopping the carriage.

2. In a carriage-stop mechanism for typewriters, a stop-and-rack assembly including, a series of stops each having a carriage-stopping tab, two elongate members arranged in spaced parallelism and each presenting a series of letter-spaced teeth defining aligned grooves in which the stop tabs may move, each tab being of a width to be contained wholly within the lateral limits of either elongate member, the spacing of said members being less than the tab width to allow the tab to straddle the space between said members and be backed by a corresponding tooth of each member, and means supporting the stops for shifting laterally of the two members, to allow the stop tabs to assume a plurality of selective positions in which the tabs may project partially beyond either member or straddle the space therebetween.

3. In a carriage-stop mechanism for a typewriter; a series of stops, arranged at regular intervals, the stops of the series being each adapted for setting to any of five positions including a first, a second, and a third effective position and two ineffective positions arranged respectively between the first and second and between the second and third effective positions; means, engageable with all of the stops of the series and capable of selective operation, to collectively restore to the adjacent ineffective position, either all the stops set at the first effective position or all the stops set at the third effective position, depending on said selective operation.

4. In a carriage-stop mechanism for a typewriter; a series of identical stops arranged at regular intervals, the stops of this series being each adapted for setting to any of five positions including a first, a second, and a third effective position, and two ineffective positions arranged respectively between the first and second and between the second and third effective positions; a universal restoring member, arranged longitudinally of the stop series, for limited reciprocatory movement transversely thereto, to collectively restore to an adjacent ineffective position all of the stops set at the first effective position, in one movement of the member and all of the stops set at the third effective position, in an opposite movement of the member.

5. In a carriage-stop mechanism for a typewriter; a series of identical stops arranged at regular intervals, the stops of the series being each adapted for setting to any of five positions including a first, a second, and a third effective position, and two ineffective positions arranged respectively between the first and second and between the second and third effective positions; a universal restoring member arranged, longitudinally of the stop series, for reciprocatory movement transversely thereto; and means to limit the transverse movements of said member to selective extents; whereby to restore to ineffective positions either all the stops set at the first, or all the stops set at the first and second, or all the stops set at the third effective position, depending on the direction and selected extent of member movement.

6. In a typewriting machine having two members constituting a frame and a carriage travelable thereon; a carriage-stop mechanism including, a single series of identical stops on the one member, settable about a common axis, individually, to position a tab thereon at different angles radiating from said axis and defining positions, one ineffective, and others for gaging the left-hand and right-hand margins of a typing line; key-actuatable stop-setting means on the other member; counterstop means on the other member, including a left margin counterstop and a right margin counterstop each normally effective to intercept the corresponding, set stop; and means mounting said counterstops for shifting movement, respectively, substantially in the plane of the angle defining the set position of the corresponding, set stop.

7. In a typewriting machine having two members constituting a frame and a carriage travelable thereon; a carriage-stop mechanism including, a single series of identical stops on the one member, settable about a common axis, individually, to position a tab thereon at different angles radiating from said axis and defining positions, one ineffective, and others for gaging the left-hand and right-hand margins of a typing line; key-actuatable stop-setting means on the other member; counterstop means on the other member, including a left margin counterstop and a right margin counterstop each normally effective to intercept the corresponding, set stop, and means mounting said counterstops for swinging movement on axes, respectively, substantially at right angles to the angular positions defined by the corresponding, set stops.

8. In a typewriting machine having two members constituting a frame and a carriage travelable thereon; a carriage-stop mechanism including, a single series of identical stops on the one member, settable about a common axis, individually, to position a tab thereon at different angles radiating from said axis and defining positions, one ineffective, and others for gaging the left-hand and right-hand margins of a typing line; key-actuatable stop-setting means on the other member; counterstop means on the other member, including a left margin counterstop and a right margin counterstop each normally effective to intercept the corresponding, set stop, means mounting said counterstops for shifting movement, respectively, substantially in the plane of the angle defining the set position of the corresponding, set stop; and means for retracting said counterstops to permit typing beyond the margins, including a single camming element cooperative with both said counterstops.

9. In a typewriting machine having two members constituting a frame and a carriage travelable thereon, a carriage-stop mechanism including a single series of identical stops on the one member, settable individually from an ineffective position to two effective positions for gaging the right and left margin positions of the carriage, respectively; key-actuatable stop-setting means operable at a station on the other member; counterstop means on the other member, presenting shoulders arranged normally to intercept the effective-set stops in carriage travel, including a right-hand margin counterstop having its shoulder in fixed position at said station to arrest a stop therein, and a left-hand margin counterstop having its shoulder normally in advance of said station; and means mounting the last-said counterstop for limited movement, upon interception of a set stop, to a limit causing arrest of the intercepted stop in said station.

10. In a typewriting machine having two members constituting a frame and a carriage travelable thereon, a carriage-stop mechanism including a single series of identical stops on the one member, settable individually from an ineffective position to two effective positions for gaging the right and left margin positions of the carriage, respectively; key-actuatable stop-setting means operable at a station on the other member; counterstop means on the other member, presenting shoulders arranged normally to intercept the effective-set stops in carriage travel, including a right-hand margin counterstop having its shoulder in fixed position at said station to arrest a stop therein, and a left-hand margin counterstop having its shoulder normally in advance of said station; means mounting the last-said counterstop for limited movement, upon interception of a set stop, to a limit causing arrest of the intercepted stop in said station; and means operable by said setting means, incident to setting a stop, to shift the last-said counterstop to stop-arresting position.

11. In a typewriting machine having two members constituting a frame and a carriage travelable thereon, a carriage-stop mechanism including a single series of identical stops on the one member, settable individually from an ineffective position to different effective positions for tabulating and for gaging the right and left margin positions of the carriage, respectively; key-actuatable stop-setting means operable at a station on the other member to set said stops individually; a normally ineffective, shiftable, tabulating counterstop on the other member, arranged, when shifted, to arrest a tabulating set stop at said station; margin counterstops on the other member, presenting shoulders arranged normally to intercept the effective-set stops in carriage travel, including a right-hand margin counterstop having its shoulder in normally fixed position at said station to therein arrest a stop, and a left-hand margin counterstop having its shoulder normally in advance of said station; and means mounting the last-said counterstop for limited movement, upon interception of a set stop, to a limit causing arrest of the intercepted stop in said station.

12. In a typewriting machine having two members constituting a frame and a carriage travelable thereon, and a line-locking device; a carriage-stop mechanism including a single series of identical stops on the one member, settable individually from an ineffective position to two effective positions for gaging the right and left margin positions of the carriage, respectively; key-actuatable stop-setting means operable at a station on the other member; counterstop means on the other member, presenting shoulders arranged normally to intercept, respectively, the effective-set stops in carriage travel, including a right-hand margin counterstop having its shoulder in fixed position at said station to arrest a stop therein, and a left-hand margin counterstop having its shoulder normally in advance of said station; means mounting the last-said counterstop for limited movement, upon interception of a set stop, to a limit causing arrest of the intercepted stop in said station; means operable by the last-said counterstop, upon stop interception and limited movement, to render effective said line-locking device; and means operable by said setting means, incident to setting a stop, to shift the last-said counterstop to stop-arresting position.

13. In a carriage-stop mechanism for a typewriter having two elements, one a frame and the other a carriage movable thereon; the combination with a series of stops on the one element, each settable to and from at least three positions; of stop setting means on the other element, including a series of keys, there being only one key for each position at which the stops are settable, said keys being each capable of a certain operating stroke, and devices operable by said keys individually, when moved through the complete operating stroke, to move a stop of said series selectively from any one and to any other of the three stop positions, depending on which of said keys is operated.

14. In a carriage-stop mechanism for a typewriter having two elements, one a frame and the other a carriage movable thereon; the combination with a series of stops on the one element, each settable to and from at least three positions; of stop setting means on the other element, including a series of keys, there being only one key for each position at which the stops are settable, said keys being each capable of a certain operating stroke, and mechanism operable differentially by said keys individually, upon movement of any one of said keys through its complete operating stroke, to move a stop of said series selectively from any one and to any other of the three stop positions.

15. In a carriage-stop mechanism for a typewriter having two elements, one a frame and the other a carriage movable thereon; the combination with a series of stops on the one element, each settable to and from at least three positions; of stop setting means on the other element, including a series of keys, there being only one key for each position at which the stops are settable, a pair of setting members arranged to engage opposite portions of a stop of the series aligned therewith, and mechanism operatively connecting said keys and said setting members and operable differentially by said keys individually to move said setting members to different extents, to set a stop of said series from any one and to any other of the three positions.

16. In a carriage-stop mechanism for a typewriter having two elements, one a frame and the other a carriage movable thereon; the combination with a series of stops on the one element, each settable to and from at least three positions; of stop setting means on the other element, including a series of key levers, there being only one key lever for each position at which the stops are settable, a pair of setting members arranged to engage opposite portions of a stop of the series aligned therewith, leverage mechanism operatively connected to said setting members and operative differentially by said key levers individually to move a stop of said series selectively from any one and to any other of the three positions.

17. In a carriage-stop mechanism for a typewriter having a frame and a motor-impelled, letter-feed-controlled carriage travelable thereon; means to release the carriage from letter-feed control; letter-space stops on the carriage; stop-setting means on the frame, including a plurality of key levers; means to lock said carriage-release means against operation, including an operating cam and means, engageable by any of said key levers, to actuate said cam.

18. In a typewriting machine having a frame and a motor-impelled carriage, in combination; a carriage letter-feed control including a gear-meshing rack movable to unmesh its gear to release the carriage to motor-impelled travel; letter-spaced settable stops on the carriage; key-operable stop-setting means on the frame; and a normally ineffective locking member actuatable by said stop-setting means to a position to bar unmeshing movement of the rack and to mesh therewith, thereby locking the carriage both against release and travel.

19. In a typewriter having two elements, one a frame and the other a letter-feed-controlled carriage travelable thereon; a series of stops on the one element, arranged at letter-space intervals and each settable to a corresponding position transversely of the carriage, any set one of said stops being adapted for gaging a typing-line start; means on the other element to individually set the stops; a counterstop on the other element, normally in the path of the set line-start-gaging stop; a second counter-stop on the other element, normally out of the path of said stop and arranged, when projected into the stop path, to arrest the set line-start stop at a point a prescribed distance from point of arrest effected by the first said counterstop; and means to project the second counterstop into the stop path.

20. In a carriage-stop mechanism for a typewriter having a frame and a motor-impelled, letter-feed-controlled carriage travelable thereon; a series of stops on the carriage, arranged at letter-space intervals and each settable to a corresponding position for gaging a typing-line start; means on the frame to individually set the stops; a line-start counterstop on the frame normally in the path of the line-start-gaging stop; a paragraphing counterstop on the frame, normally out of the path of said stop and arranged, when projected into the stop path, to arrest the set line-start stop at a point a prescribed distance from the point of arrest effected by the line-start counterstop; manually operable means to project the paragraphing counterstop into the stop path; and means, operable by said counterstop-projecting means, to release the carriage from letter-feed control for motor-impelled travel.

21. In a carriage-stop mechanism for a typewriter having a frame and a carriage travelable thereon in line-typing and return directions; a line-start stop on the carriage; a line-start counterstop on the frame, normally in the path of said stop; a paragraphing counterstop on the frame, spaced from said line-start counterstop a prescribed distance in the direction of carriage travel, normally out of the stop path and adapted to arrest the stop during carriage travel in either direction; means mounting the paragraphing counterstop for projection into the stop path and for limited movement in the direction of carriage travel, to a limit causing arrest of the stop at the same point upon carriage travel in either direction; and key-operable means to project the paragraphing counterstop into the stop path.

22. In a carriage-stop mechanism for a typewriter having a frame and a motor-impelled, letter-feed-controlled carriage travelable thereon in line-typing and return directions; a line-start stop on the carriage; a line-start counterstop on the frame, normally in the path of said stop; a paragraphing counterstop on the frame, spaced from said line-start counterstop a prescribed distance in the direction of carriage travel, normally out of the stop path and adapted to arrest the stop during carriage travel in either direction; means mounting the paragraphing counterstop for projection into the stop path and for limited movement in the direction of carriage travel, to a limit causing arrest of the stop at the same point, upon carriage travel in either direction; key-operable means to project the paragraphing counterstop into the stop path; and means, operable by said counterstop-projecting means, to release the carriage from letter-feed control for motor-impelled travel.

23. In a carriage-stop mechanism for a typewriter having a frame and a carriage travelable thereon in line-typing and return directions, a series of letter-spaced stops on the carriage settable individually to an effective position to define a typing line margin; a margin counterstop on the frame, normally in the path of a set stop; a paragraphing counterstop on the frame, spaced from the margin counterstop a prescribed distance in the direction of carriage travel, normally out of the stop path and having oppositely facing stop-engageable shoulders; means mounting the paragraphing counterstop for projection into the stop path and for limited movement in the direction of carriage travel; and key-operable means to project the paragraphing counterstop into the stop path; said limited movement being substantially equal to the aggregate thickness of one of the settable stops and the countedstop between its shoulders, whereby to arrest the set stop at the same point, upon carriage travel in either direction.

24. In a carriage-stop mechanism for a typewriter having a frame and a motor-impelled letter-feed-controlled carriage travelable thereon; a stop on the carriage; a counterstop on the frame normally out of the path of said stop; means mounting said counterstop for projection into the stop path and for limited shifting in the counter-letter-feed direction of carriage travel; means to project said counterstop into the stop path; and means to release the carriage from letter-feed control for motor-impelled travel, including an actuating member; said counterstop, in its unshifted position, being arranged to engage said actuating member to operate said carriage-releasing means upon projecting the counterstop, said counterstop being also arranged to disengage said member upon shifting the counterstop in the counter-letter-feed direction incident to its interception of the stop.

25. In a carriage-stop mechanism for a typewriter having a frame and a motor-impelled, letter-feed-controlled carriage travelable thereon; a stop on the carriage; a first counterstop on the frame, normally in the path of said stop; a second counterstop on the frame, spaced from said first counterstop a prescribed distance in the direction of carriage travel and normally out of the path of said stop; means mounting said second counterstop for projection into the stop path and for limited shifting in the counter-letter-feed direction of carriage travel; key-operable means to project said second counterstop into the stop path; means, operable by said counterstop-projecting means, to release the carriage from letter-feed control for motor-impelled travel and, operable upon shifting of said second counterstop incident to its interception of the stop, to enable restoring the carriage to letter-feed control.

JOHN TOGGENBURGER.